Sept. 16, 1947.  P. J. CONNERS  2,427,590
CONVEYER BELT PULLEY
Filed April 19, 1944
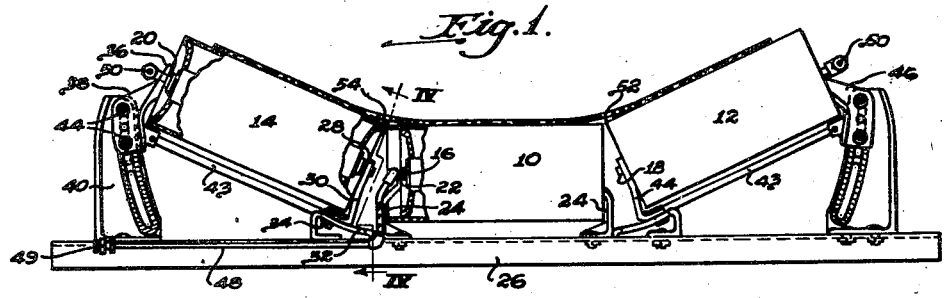
Fig. 1.
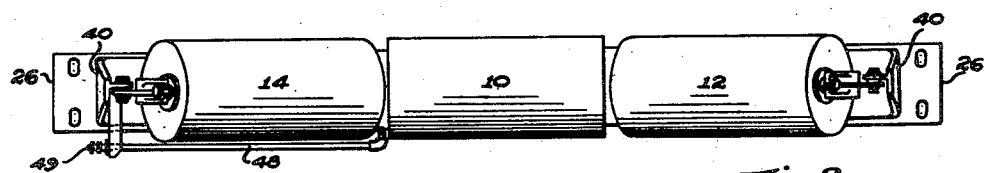
Fig. 2.
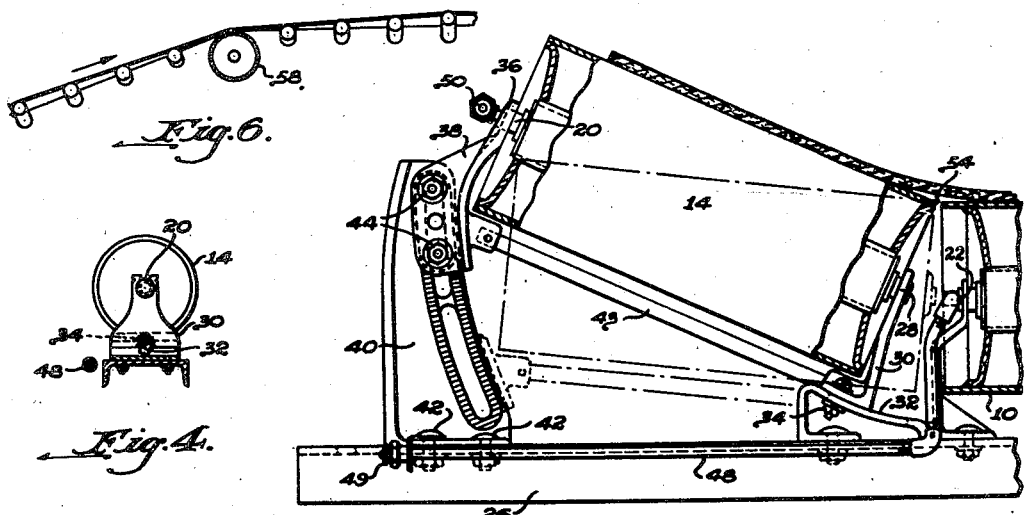
Fig. 6.
Fig. 4.
Fig. 3.
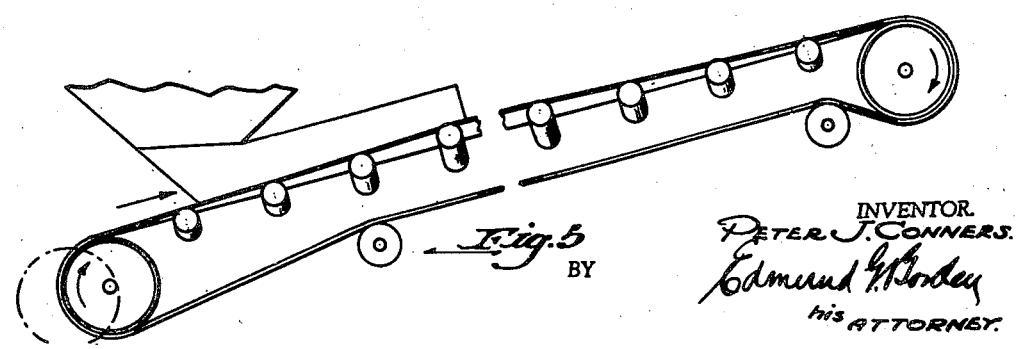
Fig. 5.
INVENTOR.
PETER J. CONNERS.
BY Edmund G. Borden
his ATTORNEY.

Patented Sept. 16, 1947

2,427,590

UNITED STATES PATENT OFFICE 2,427,590

CONVEYER BELT PULLEY

Peter John Conners, Pittsburgh, Pa., assignor to Koppers Company, Inc., Pittsburgh, Pa., a corporation of Delaware Application April 19, 1944, Serial No. 531,779

2 Claims. (Cl. 198—192)

This invention relates to conveyor belt idlers. More particularly the invention relates to idler pulleys for troughing conveyor belts.

Conveyor belts are generally troughed on their load carrying run and are carried flat on their return run. Near the points of feed and discharge of material to or from the belt and on vertical curves it is quite desirable to make an easy and gradual change of the belt surface to or from the flat surface to a troughed surface. Further the depth of the troughing of the belt should vary in accordance with the type of material being handled. The troughing of the belt can be readily accomplished by using idlers which are made up of three or more separate pulleys, the axes of which are angularly adjustable. Such angularly adjustable pulleys have been used in the past.

The conveyor belts commonly used for carrying granular materials are made of rubber built up on a series of plies of fabric. Such belts are made up of a rubber outside coating which is applied to one or a series of rubberized fabrics. These belts are expensive and must be protected against undue wear. The greatest strain on the belt is caused by internal heating of the rubber which allows the rubber coating to become separated from the fabric and weakens the belt structure. The points of greatest strain occur at the junction of the pulleys due to the weight of the material carried on the belt and the points of bending, depending upon the angle of the troughing. The heavy loading of the belt tends to flatten it at the angles of the pulleys and to drive it into any gap or space between the pulleys. Also some types of angular adjustments of the pulleys tend to raise or lower the edges of one of the pulleys vertically relatively to the edges of the adjacent pulley. These edges rapidly cut or wear the belt. In some positions of the pulleys the edges act to crease the belt. When idlers are made up of pulleys having their axes in different planes the troughing of the belt tends to drive the belt into contact with the edges of each of the pulleys.

The primary object of the present invention is to provide a troughing pulley with which the troughing of the conveyor belt may be effected with a plurality of the angularly adjustable pulleys without placing undue wear or strain on the belt at the adjoining ends of the pulleys.

Another object is to provide a troughing pulley by which the troughing of the conveyor belt may be carried out with angularly adjustable pulleys without changing the width of the gap between the ends of the pulleys.

A further object of the invention is to provide a troughing pulley by which the troughing of the conveyor belt may be effected while maintaining contact and support for the belt upon the pulleys across substantially the entire width of the belt.

With these and other objects in view the invention consists in the improved troughing pulley for conveyor belts hereinafter described and particularly defined in the claims.

The various features of the invention are illustrated in the accompanying drawings in which Figure 1 is a view in front elevation, with parts in section, showing the preferred form of the idler troughing pulley;

Figure 2 is a plan view of the pulley shown in Figure 1;

Figure 3 is an elevational view with parts in section illustrating more particularly the adjustable pulley of the improved idler pulley;

Figure 4 is a detail sectional view taken on the line IV—IV of Figure 1 of the supporting bracket for the adjustable pulley journal;

Figure 5 is a schematic view illustrating the manner in which the improved idler pulley may be used for supporting a conveyor belt and the relative arrangement of the idler pulleys for troughing the belt on the carrying run; and Figure 6 is a schematic view illustrating the manner in which the improved idler pulley may be used for guiding the belt over vertical curves.

The preferred form of the idler pulley illustrated in Figures 1 and 2 consists of a central fixed pulley 10 with adjustable pulleys 12 and 14 mounted adjacent the ends of the fixed pulley. The pulleys 10, 12 and 14 are rotatably mounted on axles 16, 18 and 20 the axes of which are positioned in the same vertical plane.

The axle 16 is mounted in journal bearings 22 one of which is located at each end of the pulley 10 and the journal bearings constituting integral parts of brackets 24. The brackets 24 are held in fixed position on a beam 26 which is a part of the conveyor frame. The axle 20 of pulley 14, Figure 3, is mounted at its inner end in a journal bearing 28 formed on the upper end of a bracket 30 which is adjustably mounted on a slotted base 32 and held in fixed position by a bolt 34. The outer end of the axle 20 is rotatably mounted in a journal bearing 36 formed on the end of a bracket 38 which is adjustably mounted in a bracket 40 secured to the beam 26 by bolts 42. The brackets 38 and 40 are provided with serrations on their opposing faces whereby they may be securely locked together in any desired position by bolts 44. The mounting of the axle 20 is arranged to permit it to be adjusted through a vertical angle of approximately 20 degrees to the axis of the axle 16. The brackets 30 and 38 are tied together by a rod 43 so that the brackets may be adjusted simultaneously to change the angle setting of the axle 20.

The axle 18 is mounted in journal bearings of brackets 45 and 46 which have the same form and mounting as the brackets 30 and 38 which support the axle 20.

The bearings of the axle 16 are supplied with a lubricating grease which is introduced into the bearings through a tube 48 having a fitting 49, Figures 1 and 3; the outer ends of the axles 18 and 20 are provided with grease fittings, Figures 1 and 3, by which lubricant may be supplied to the outer bearings of the axles 18 and 20. The axles 16, 18 and 20 are hollow so that the grease which is forced through the fittings 49 and 50 may pass to the inner bearings of the axles.

The mounting and arrangement of the adjustable pulleys 12 and 14 constitute an important feature of the present invention. The axles 18 and 20 and their supporting brackets are adjustable respectively about pivot points 52 and 54, Figures 1 and 3. The pivot points 52 and 54 are the points of contact of the inner edges of pulleys 12 and 14 with the under surface of the belt near the adjacent ends of the fixed pulley 10, in a vertical plane passing through the axes of the pulleys when the belt is flat. The arcuate slots for the bolts 44 and 34 for supporting the brackets of the axles 18 and 20 are formed about the pivot points 52 and 54 as a center so that the inner edges of the pulleys 12 and 14 immediately under the belt remain fixed for the different angular positions of adjustment of the pulleys 12 and 14. The pulleys 12 and 14 are independently adjustable about the pivot points and do not necessarily have to be set at the same angle with reference to the horizontal in obtaining the desired cupping of the conveyor belt.

By the above described arrangement the gap or space between the ends of the fixed pulley and the inner ends of the adjustable pulleys has the same width irrespective of the angular adjustment of the axles of the pulleys. Furthermore the pivot points of the adjustable pulleys 12 and 14 remain in the same horizontal plane with reference to the top of the fixed pulley so that these points are not raised or lowered when the angular adjustment of the adjustable pulleys is changed. This arrangement permits the troughing of the belt while supporting the belt across substantially its entire width on the upper edges of the pulleys.

The use of angularly adjustable pulleys as compared with pulleys that are mounted on axles held in a fixed angular position, permits the troughing of the belt to be changed from a slight to a deep troughing by an easy gradual change. The belt may be gradually troughed quite deeply by use of several pulleys without putting undue strain on the belt or tending to separate the plies of the belt or crease the belt. By maintaining the gap between the pulleys narrow, the belt is not squeezed between the pulleys to permit the edges of the pulleys to cut or crease the belt.

In Figure 5 is illustrated diagrammatically an arrangement by which the idler pulleys may be adjusted to vary the troughing of the belt in order to provide for handling different kinds of materials. Finely divided material can be effectively carried on a comparatively flat belt, whereas coarser materials require a deeply troughed belt. Furthermore, it is often advantageous to deepen the trough of a belt at the point of loading and to flatten the belt at the point of discharge.

In Figure 6 is illustrated the arrangement of the adjustable idler pulleys with relation to a flat pulley for changing the vertical angle of the run of the conveyor belt. The angularly adjustable pulleys allow the cupping of the belt to be gradually changed to and from a flattened position before and after passing over an angle-changing pulley 58.

The improved adjustable idler pulley is in effect a pulley built with its axis in a horizontal plane and having the outer ends of the pulley adjustable through a vertical angle. The cupping of the belt is accomplished through the adjustment of the outer end pulleys which tend to raise the outer edges of the belt without substantially changing the support for the belt throughout its entire width. The fixed relative position of the free edges of the adjustable pulleys with reference to the edges of the fixed central pulley does not allow these edges to be placed in a position where they cut the belt. Further the edges are spaced so close together that they do not act to crease the belt. The 20° angular adjustment of the outer pulleys will give a sufficient cupping form to the belt to handle any of the different types of materials that are to be carried by the belt.

In the drawings the idler pulley has been illustrated as made up of a fixed central pulley and two outer adjustable pulleys. The fixed central pulley may be made up of several units. The outer pulleys may be longer or shorter than the fixed central unit. In this way the angular adjustment of the pulley parts can be made to conform to the shape of the bottom of the belt as it is cupped, and provide a support for the belt over its entire width.

The preferred form of the invention having been thus described what is claimed as new is:

1. A troughing idler for conveyor belts comprising: pulley means rotatably mounted on a fixed axis; a pulley rotatably mounted on an adjustable axle in the vertical plane of the fixed axis and having its pulley face closely adjacent to the face of the said pulley means; movable bearings for the adjustable axle; brackets for supporting the bearings; and arcuately formed members for supporting the brackets in adjustable position in pivotable relationship about the point of intersection of the upper inner edge of the adjustable pulley with the uppermost element of the fixed pulley means, and so arranged with relation to said bearings and brackets that the adjustable pulley can be set in different angular positions while retaining the said inner edge uniformly spaced from and in the line of contact of the face of the fixed pulley means.

2. A troughing idler for conveyor belts comprising: pulley means rotatably mounted on a fixed axis; a pulley rotatably mounted at each end of the fixed pulley means on an adjustable axle in the vertical plane of the fixed axis, each pulley having its face closely adjacent to the face of the said pulley means; movable bearings for the adjustable axles; brackets for supporting the bearings; a rod rigidly connecting the brackets at each end of each adjustable axle; arcuately slotted members for supporting the brackets in adjustable position, the slots having as their center of curvature the point of intersection of the upper inner edge of their respective adjustable pulleys with the uppermost element of the pulley means, and being so arranged with relation to said bearings and brackets that the adjustable pulleys can be clamped in different angular positions while retaining their said inner edges uniformly spaced from and in the line of contact of the face of the fixed pulley means.

PETER JOHN CONNERS.

REFERENCES CITED

The following references are of record in the file of this patent:

UNITED STATES PATENTS

| Number | Name | Date |
|---|---|---|
| 754,335 | McCabe | Mar. 8, 1904 |
| 977,987 | Willson | Dec. 6, 1910 |